United States Patent
Hollister et al.

(10) Patent No.: US 6,195,737 B1
(45) Date of Patent: Feb. 27, 2001

(54) METHOD AND APPARATUS FOR RELATIVE ADDRESSING OF TILED DATA

(75) Inventors: Brad Hollister, Newton; Robert Feldstein, Grafton, both of MA (US)

(73) Assignee: ATI Technologies Inc., Thornhill (CA)

( * ) Notice: Subject to any disclaimer, the term of this patent is extended or adjusted under 35 U.S.C. 154(b) by 0 days.

(21) Appl. No.: 09/046,181

(22) Filed: Mar. 23, 1998

(51) Int. Cl.[7] .................................................. G06F 13/00
(52) U.S. Cl. .......................... 711/220; 711/217; 711/218; 711/219
(58) Field of Search .................... 711/217, 218, 711/219, 220

(56) References Cited

U.S. PATENT DOCUMENTS

| | | | |
|---|---|---|---|
| 4,293,917 | * | 10/1981 | Wasserman ........................ 708/101 |
| 4,315,319 | * | 2/1982 | White ................................. 702/104 |
| 5,032,981 | * | 7/1991 | Bril et al. ........................... 711/220 |
| 5,301,267 | * | 4/1994 | Hassett et al. ..................... 395/169 |
| 5,579,453 | * | 11/1996 | Lindenfelser et al. ............ 395/115 |
| 5,828,382 | * | 10/1998 | Wilde ................................. 345/501 |
| 5,961,580 | * | 10/1999 | Mahalingaiah .................... 708/670 |
| 5,963,447 | * | 10/1999 | Kohn et al. ........................ 706/10 |

* cited by examiner

Primary Examiner—Matthew Kim
Assistant Examiner—Fred F. Tzeng
(74) Attorney, Agent, or Firm—Mackison & Reckamp, P.C.

(57) ABSTRACT

The invention provides a method and apparatus that provides for a determination of a memory address for an object coordinate in a non-linear addressing scheme. To minimize computation complexity, the memory address of the object coordinate is based upon a previously computed address of an object coordinate that is in proximity to the given object coordinate.

20 Claims, 9 Drawing Sheets

| MOD 4 (Q1) | Q2 - Q1 | | | | | | | |
|---|---|---|---|---|---|---|---|---|
| | 1 | 2 | 3 | 4 | 5 | 6 | 7 | 8 |
| 0 | 1 | 2 | 3 | 12 | 13 | 14 | 15 | 24 |
| 1 | 1 | 2 | 11 | 12 | 13 | 14 | 23 | 24 |
| 2 | 1 | 10 | 11 | 12 | 13 | 22 | 23 | 24 |
| 3 | 9 | 10 | 11 | 12 | 21 | 22 | 23 | 24 |

(b)

| MOD 3 (Q1) | Q2 - Q1 | | | | | | |
|---|---|---|---|---|---|---|---|
| | 1 | 2 | 3 | 4 | 5 | 6 | 7 |
| 0 | 4 | 8 | 2400 | 2404 | 2408 | 4800 | 4804 |
| 1 | 4 | 2396 | 2400 | 2404 | 4796 | 4800 | 4804 |
| 2 | 2392 | 2396 | 2400 | 4792 | 4796 | 4800 | 7192 |

METHOD AND APPARATUS FOR RELATIVE ADDRESSING OF TILED DATA

FIELD OF THE INVENTION

This invention relates to a system for non-linear memory access and in particular for accessing data stored in tiled, or block, formats.

BACKGROUND OF THE INVENTION

Many computer and data base applications involve data having a multi-dimensional nature. For example, data in a spreadsheet is referenced with regard to the particular row and column in which the data appears. The same is applicable to video image data, physical object data, and hierarchical data base elements. Video image data is referenced with regard to the particular x and y coordinate location at which the image data is displayed. Physical object data is referenced with regard to x, y, z coordinates, often termed the real-world coordinates of the object. Hierarchical data base elements are referenced by their path in a multidimensional tree structure. Traditionally, the coordinates associated with the representation of the data are termed object coordinates, or virtual coordinates.

Figure 1:
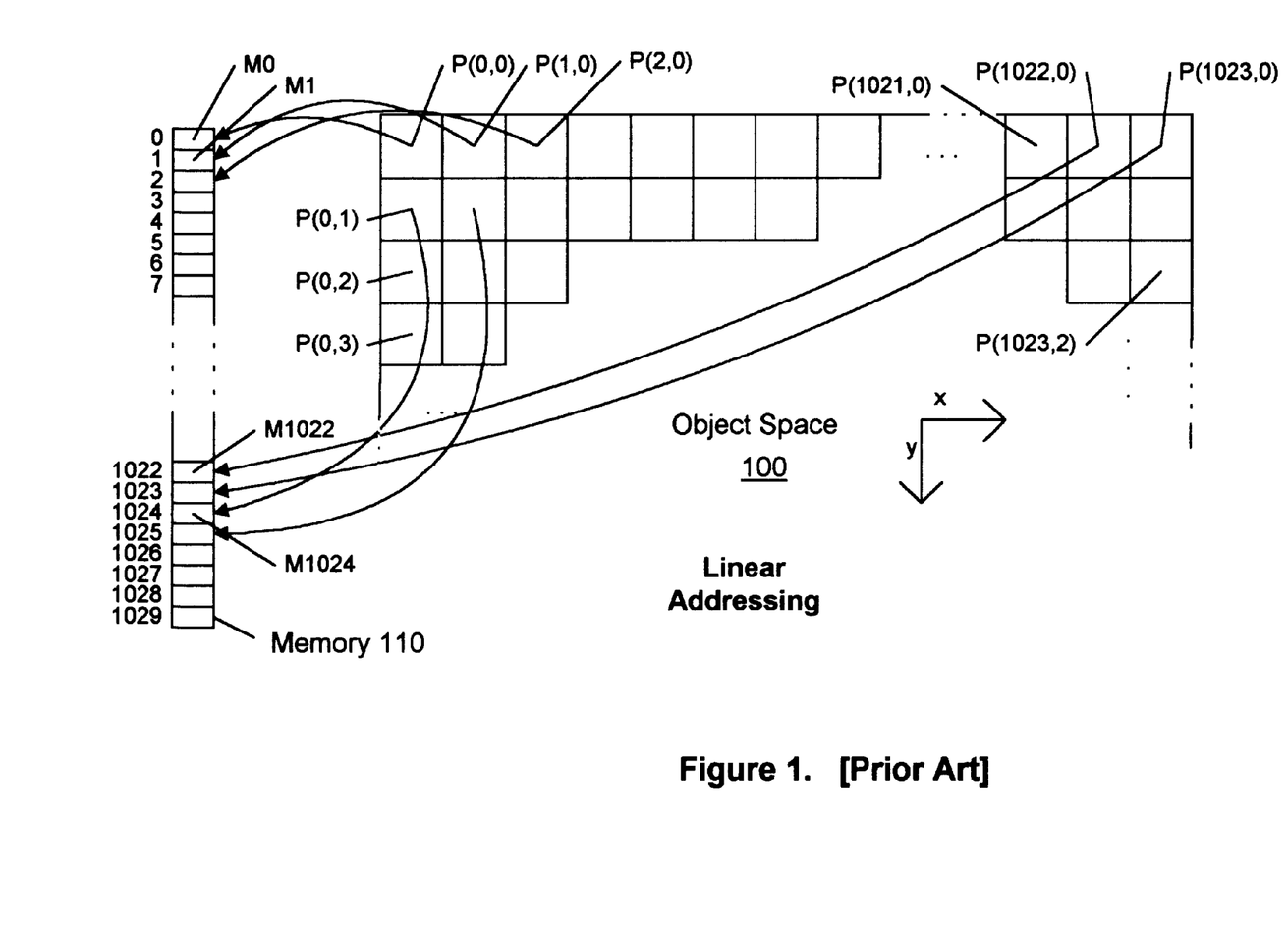
FIG. 1 illustrates a linear addressing scheme for mapping object coordinates to memory addresses.

Conventional memory devices are structured with a unidimensional addressing scheme. That is, each data element within the memory is referenced by a unique, single dimensioned, address. Storing multi-dimensional data in a unidimensional memory requires a mapping from each multidimensional object coordinate to a corresponding unidimensional memory address. One such mapping of a multidimensional representation to a unidimensional address is a linear mapping, as shown in FIG. 1. The object space 100 comprises data elements, or picture elements (pixels), arranged in a two-dimensional address space. Each pixel is represented by its location in these two dimensions, as shown by P(0,0), P(1,0), etc. in FIG. 1. In the linear mapping shown in FIG. 1, each of the pixels in the first row, or line, of pixels is stored sequentially in the memory 110. The pixels of the second line, P(0,1), P(1,1), etc. are stored sequentially after the first line of pixels. In a linear mapping, a linear equation is applied to compute the memory address corresponding to each object coordinate. For example, in the mapping shown in FIG. 1, the memory address, A, is equal to $x+1024*y$, where x is the first pixel coordinate, and y is the second pixel coordinate. In a three dimensional, (x, y, z), system, the memory address is computed as $A=z*K2+y*K1+x$, where K1 is the range of x, and K2 is the product of the range of x times the range of y.

When a linear mapping scheme is utilized, the address corresponding to an object coordinate can be calculated relative to a previously computed address. For example, in the mapping of FIG. 1, where $A=x+1024*y$, the address of a pixel to the right of another is offset by 1 from the address of the other; the address of a pixel below another is offset by 1024 from the address of the other. Utilizing this linear address relationship, memory access techniques can be optimized to process this data. For example, to process pixels lying along a vertical line, each entity can be accessed by adding 1024 to the prior address, rather than computing the address of each entity directly, using the $x+1024*y$ formula. In this manner, a single addition (+1024) is used to compute the next address, rather than a multiplication ($1024*y$) and an addition (+x). In a similar manner, data at any periodic interval can be quickly accessed.

Although the linear addressing scheme offers considerable computational advantages for determining a coordinate's associated memory address, it does have disadvantages. In a linear mapping scheme, there is a fixed "distance" in memory 110 between data elements that are "adjacent" to each other in the object space 100. That is, for example, each pixel separated by one line in the object space 100 is separated by M locations in the memory 110, where M is the length of the line. In FIG. 1, P(0, 1) is at memory address 1024, whereas it's vertically adjacent element P(0,0) is at memory address 0, a separation of 1024 locations in memory. In the three-dimensional case discussed above, a distance of K2 separates data elements in adjacent z coordinates in memory. In many systems, the "cost", in terms of access time or access difficulty, is directly related to the distance between data items in memory. Often, a "block" of memory is accessed in a single memory access operation. If the "successive" data element, in the object coordinate space, is not within the block of memory accessed, a subsequent access is required. For example, in FIG. 1, the processing of data elements in a left to right fashion will be efficient, because each accessed block will contain a multitude of the data elements desired, thereby reducing the number of accesses required. Conversely, the processing of data elements of FIG. 1 in a top to bottom fashion will be inefficient, because each accessed block will typically contain only one of the desired data elements, the next desired data element being located a substantial distance (1024 memory locations) away from the prior vertically adjacent data element.

Figure 2:
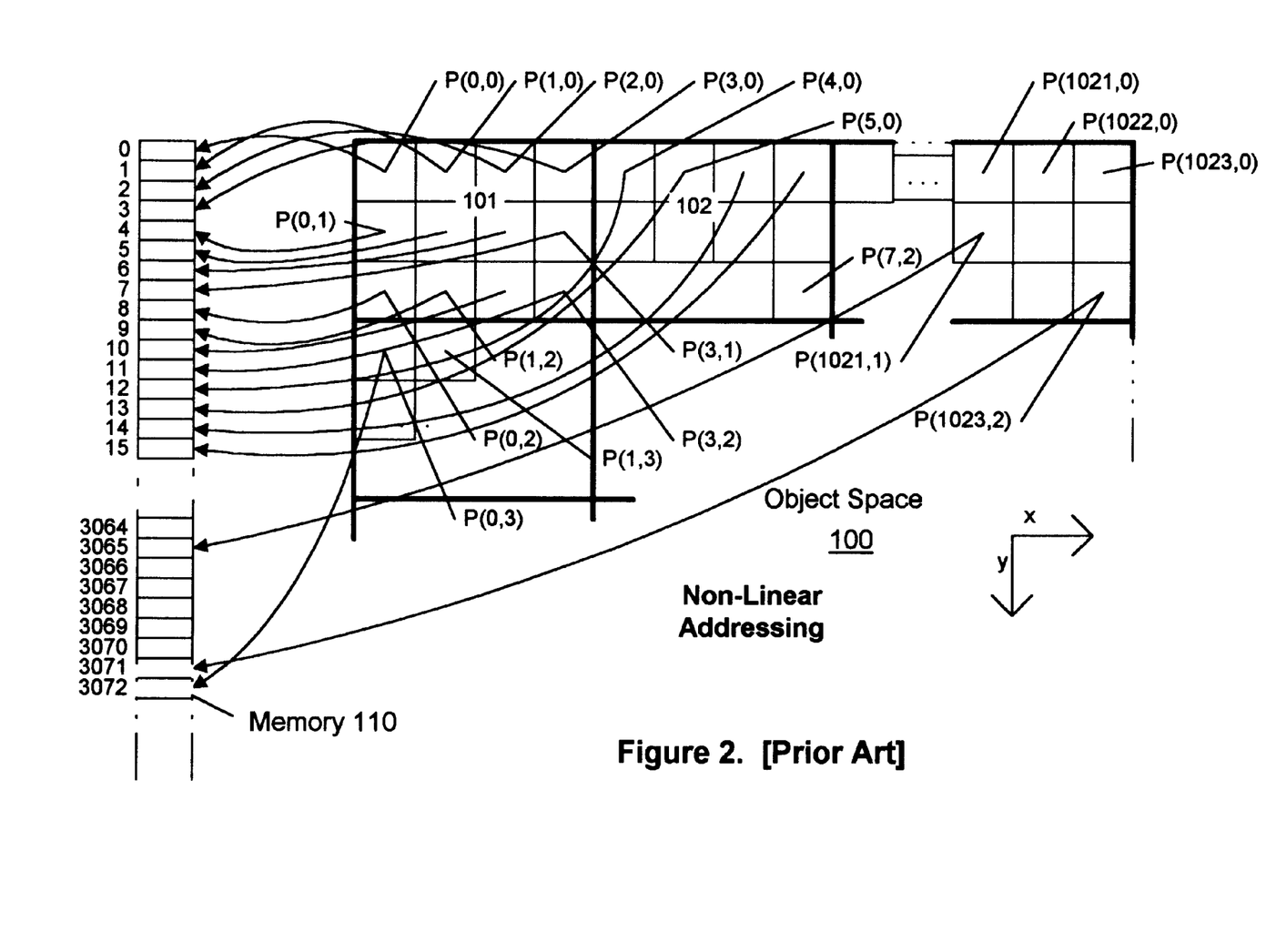
FIG. 2 illustrates a non-linear addressing scheme for mapping object coordinates to memory addresses.

The inefficiencies of linear memory access for multidimensional data structures can be particularly problematic. Multi-dimensional applications often process data in an "area" or "regional" scheme. For example, in image processing, individual data elements are often smoothed, wherein a data element's value is modified by the values of data elements adjacent, in the object space, to this data element. Such area dependent processing will be efficient for processing data elements in one dimension, but inefficient in the other dimension, if a linear addressing scheme is utilized. To optimize performance in area or regional processing schemes, a non-linear mapping of multidimensional data is utilized to allocate contiguous blocks of memory to areas or regions of the object space, as shown in FIG. 2. The object space is partitioned into sub-areas, or tiles, and the elements of each tile are stored in a contiguous block of memory.

In FIG. 2, the object space is partitioned into tiles 101, 102, etc. of 12 pixels, arranged in a 4×3 manner. The first tile 101 comprises the data elements within the bounds between P(0,0) and P(3,2); the second tile 102 comprises the data elements within the bounds between P(4,0) and P(7,2); etc. As shown, the mapping of the first tile 101 is as follows: the first four pixels (P(0,0)–P(3,0)) are stored in the first four memory locations (memory address 0–3); the four pixels from the line below (P(0,1)–P(3,1)) are stored in the next four memory locations (memory address 4–7); the four pixels from the next line below (P(0,2)–P(3,2)) are stored in the next four memory locations (8–11). Thus, the first 12 memory locations contain the data elements of the first 4×3 tile 101. The second tile 102 is mapped in the next 12 memory locations in the same manner: pixels P(4,0)–P(7,0) are stored in the next four memory locations (12–15); pixels P(4,1)–P(7, 1) are stored next (16–19); etc. In this non-linear addressing scheme, pixels that are in proximity to each other in either dimension in the object space are generally close to each other in memory space, as compared to a linear addressing scheme.

A disadvantage of tiling, however, is that the non-linear mapping does not provide for the relative memory access technique discussed above. Because the mapping is non-linear, the relationship between the addresses of the data elements is not merely additive, as in the linear mapping scheme. That is, for example, the determination of an address corresponding to a data element adjacent to another data element is not merely effected by the addition of a constant, as in a linear addressing scheme, discussed above. Conventional memory access techniques for non-linear mappings require the direct computation of each memory address from the object coordinates. In FIG. 2, for example, P(0,2) is 4 memory locations beyond P(0,1), whereas P(0,3) is 3064 memory locations beyond P(0,2). Determining the address of every Nth data element cannot be effected by merely adding N*k to each preceding address, as in the linear addressing scheme. Conventionally, determining the memory address of P(0,3), and in general all coordinates in a non-linear mapping, requires a direct computation, based upon the object coordinate, rather than a relative computation, based on a previously computed address. Because the address of each coordinate in a non-linear mapping must be computed directly, the savings achieved by the determination of an address from a previously computed address, as in the linear addressing scheme, are not realized in a conventional non-linear mapping scheme.

Therefore, a need exists for a method and apparatus that provides the regional and area processing benefits of non-linear mapping, as well as the memory access benefits of linear mapping.

DESCRIPTION OF THE PREFERRED EMBODIMENTS

Generally, the invention provides a method and apparatus that provides for a determination of a memory address for an object coordinate in a non-linear addressing scheme using a relative addressing computation. The memory address of the object coordinate is based upon a previously computed address of an object coordinate in proximity to the given object coordinate. The relationship between the addresses of adjacent or proximal object coordinates in a non-linear addressing scheme, albeit also non-linear, can be significantly computationally simpler than the non-linear relationship between each object coordinate and its address. Thus, by employing the computationally simpler technique after an initial address is determined, significant computational savings can be achieved.

In a preferred embodiment, an initial address is computed by utilizing the non-linear addressing process conventionally applied for a non-linear mapping, and thereafter applying the different, computationally simpler, process to compute subsequent addresses, using this initial address. The process is iterative, such that subsequent addresses are computed based upon addresses computed from the initial address. The determination of subsequent addresses utilizes an additive offset from a previously computed address. In this manner, the computation of an address is a mere additive process, rather than the complex, non-linear process conventionally utilized.

In another preferred embodiment, the determination of subsequent addresses is accomplished by defining a set of increment values, and determining the additive offset via a selection from amongst this set. In another preferred embodiment, the determination of subsequent addresses is accomplished by loading a subset of the object coordinate into specific bits in an offset parameter, such that this bit-loading produces an offset in dependence upon a portion of the object coordinate.

Figure 3:
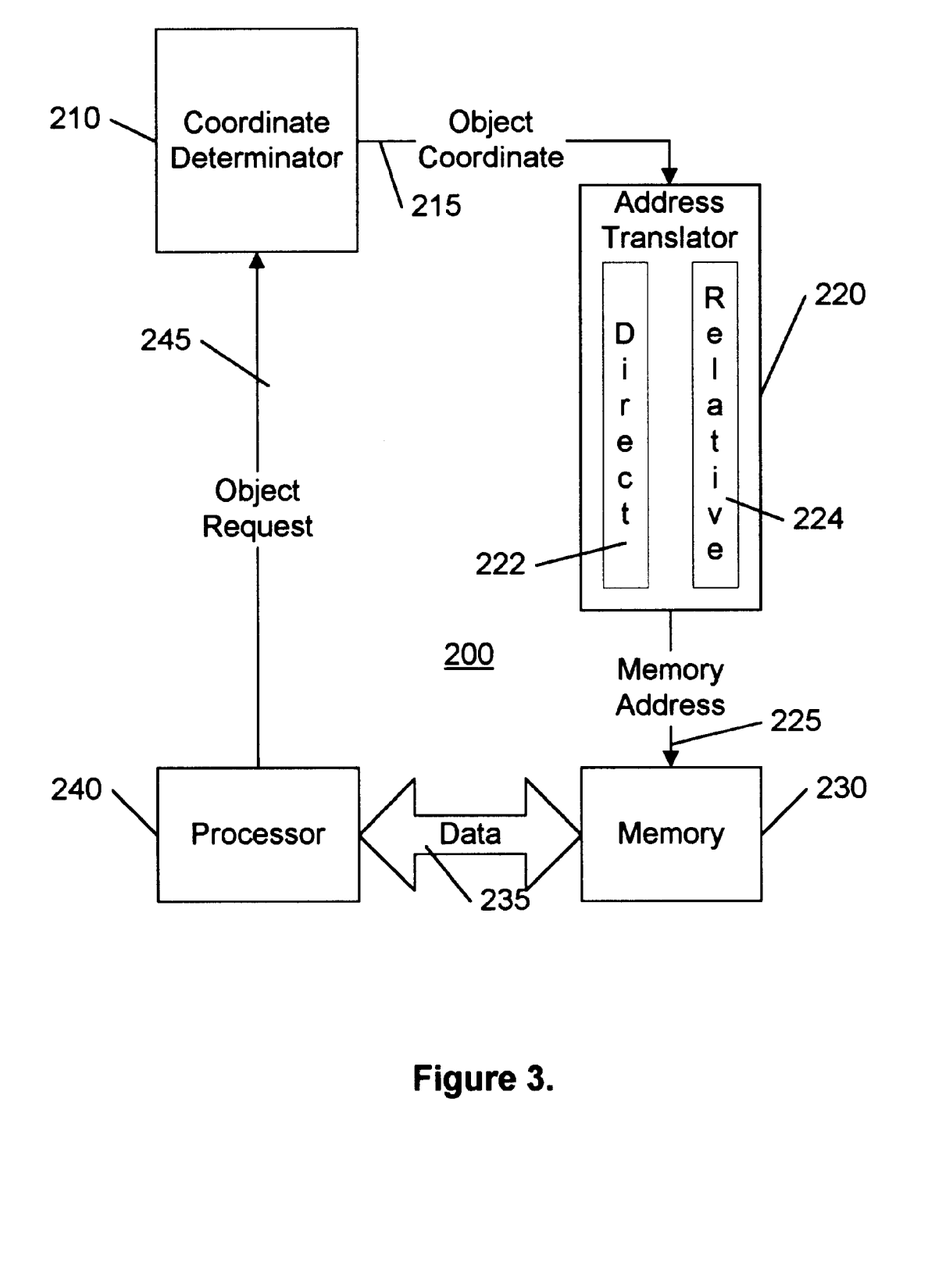
FIG. 3 illustrates a direct and relative addressing scheme for mapping object coordinates to memory addresses, in accordance with this invention.

FIG. 3 illustrates a memory access system 200 comprising a processor 240, a coordinate determinator 210, an address translator 220, and a memory 230. The processor 240 communicates an object request 245 to the coordinate determinator 210. The request 245 contains an identification of the object element for which the processor requires memory access. The coordinated determinator 210 determines the object space coordinates 215 associated with this object element. For example, in a graphics application, the determinator 210 will determine the x, y, z coordinates of a point in the object; in a spreadsheet application, the determinator 210 will determine the row and column indices of a cell in the spreadsheet; etc. Although for ease of understanding block 210 is described as a coordinate determinator, the function of the block 210 is to determine a unique identifier, or address, of the object element, in the object space; commonly it will be a multi-dimensional coordinate, but it may be any form of addressing in the object space.

The address translator 220 performs the mapping of the object coordinate 215 into a memory address 225. The address translator comprises two methods for translating, or mapping, an object coordinate 215 into a memory address 225. The first method 222 is the direct translation algorithm associated with the non-linear mapping scheme employed; the second method 224 is a relative addressing scheme that uses a previously computed address to compute a subsequent address.

Figure 4:
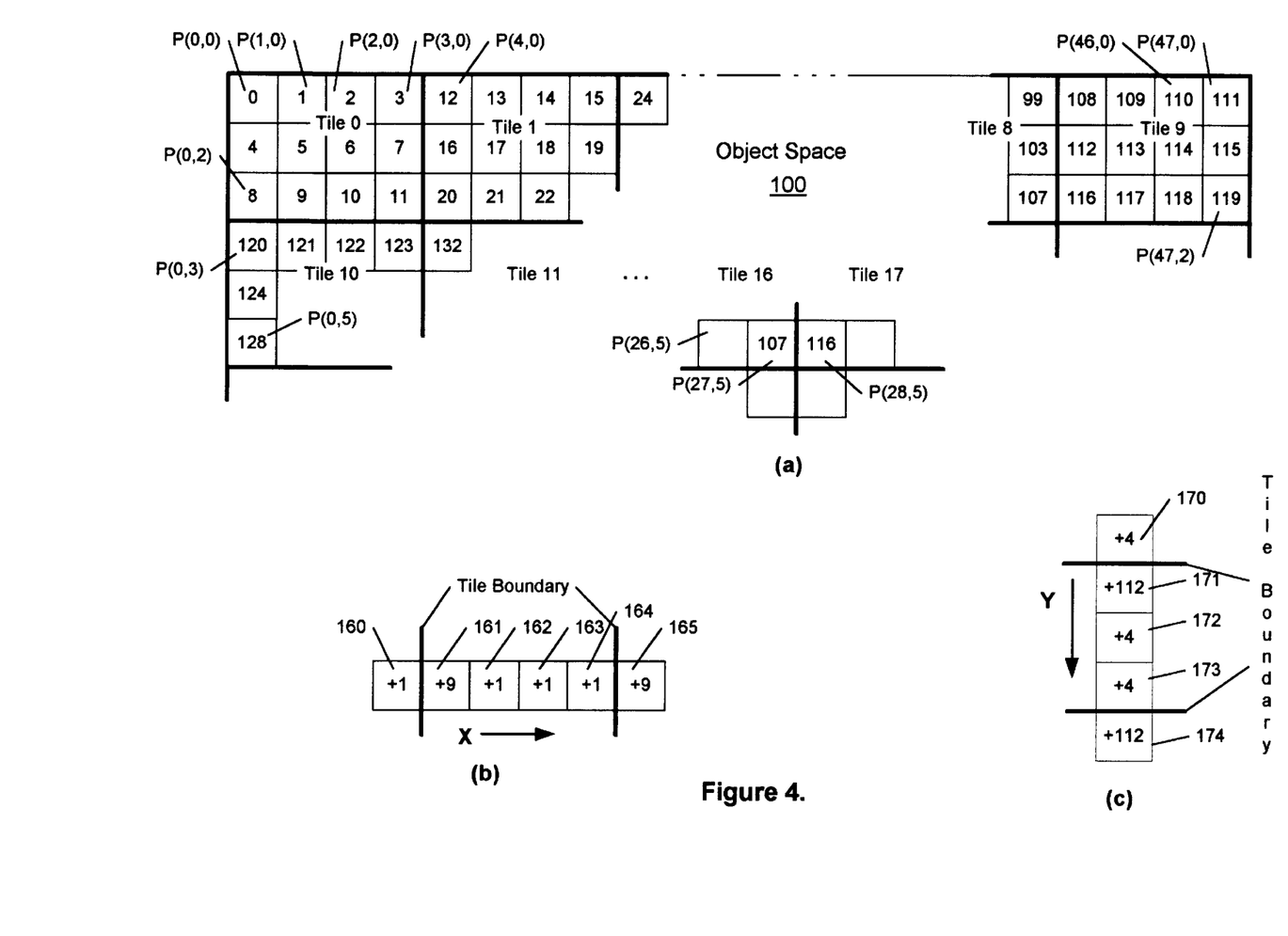
FIG. 4 illustrates a system for accessing memory stored via a non-linear mapping in accordance with this invention.

Each non-linear mapping scheme will have, by definition, a method of translating an object coordinate to a memory address. In a non-linear tiling scheme, the first method 222 of the translation algorithm will comprise the steps of determining which tile the coordinate is located, and how far from the start of the tile the memory associated with this coordinate is located. Consider, for example, a 4×3 tiling scheme having 10 tiles per row, as shown in FIG. 4(a). Tile 0 is mapped to memory addresses 0 through 11; tile 1 is mapped to memory addresses 12 through 23; etc. The memory address of the object elements within the tiles are shown in FIG. 4(a). In a conventional mapping scheme, the memory address of a particular object element is computed by determining in which tile the element is located, then determining how far from the first element of the tile the particular tile is located. As shown, the object element at P(5,0) is in tile 1, whose memory address starts at 12 (tile number* number of elements in tile). It is one element beyond the first element in the tile, and therefore its address is 13 (12+1).

In another example, the memory address of an element at object coordinate (27,5) is computed by the conventional direct method 222 as follows. Coordinate (27,5) is determined to be in tile column 6 (tile column=int(x/4)), and in tile row 1 (tile row=int(y/3)); that is, it is in the tile which is 6 tiles to the right of, and 1 tile below the first tile. Because there are 10 tiles per row, coordinate (27,5) is thus within tile number 16 (tile column+tile row* number of tiles per row). The first element of tile number 16 is at object coordinate (24,3) (tile column * number of element columns per tile, tile row* number of element rows per tile). This first element will be located at memory address 192 (tile number* number of elements per tile). Coordinate (27,5) is three elements to the right (27−24) and two below (5−3) the coordinate (24,3), and therefore it is 11 memory locations (3 columns+2 rows* number of columns in tile) beyond, at address 203 (192+11).

The second method 224 of computing an address in the address translator 220 is a relative addressing scheme: the address is computed relative to a previously computed address. The non-linear nature of the non-linear mapping is characterized by the relationship between the addresses of adjacent or proximate elements in the object space. That is, rather than defining the mapping with respect to each coordinate, as in the first method 222 of computing discussed above, the mapping of the second method 224 is defined with respect to the address of an adjacent or proximal element. Although the mapping with respect to the address of an adjacent or proximal element in the object space is also non-linear, the non-linear relationship between the addresses of adjacent data elements is often computationally simpler than the non-linear relationship between an individual data element's object space coordinate and its memory address.

Each non-linear mapping scheme will exhibit a pattern of memory addresses, relative to each other. In the example 4×3 tile mapping of FIG. 4(a), the relationship between the memory address of an object element and the memory address of its preceding horizontally adjacent object element is shown in FIG. 4(b). As shown at 160, 162, 163, and 164, the memory address of progressing object elements from left to right, are incremented by+1 from the preceding element's address, except, as shown at 161 and 165, the memory address is incremented by 9 each time the boundary between tiles is crossed. The relationship between the addresses of horizontally adjacent data elements of FIG. 4(a) can be expressed as:

If the next horizontally adjacent element is in the same tile, add 1 to the known address;

otherwise                                              (1)

add 9 to the known address.

Similarly, as shown in FIG. 4(c), adjacent vertical object elements have a +4 memory address increment at 170, 172, and 173. At each tile boundary crossing in the vertical y direction, the memory address increment 171, 174 is +112. The relationship between the addresses of vertically adjacent data elements of FIG. 4(a) can be expressed as:

If the next vertically adjacent element is in the same tile, add 4 to the known address;

otherwise                                              (2)

add 112 to the known address.

Thus, continuing with the example 4×3 tiling arrangement of FIG. 4(a), where the memory address of object coordinate (27,5) was determined to be 203 by the first addressing method 222, the memory address of object coordinate (28,5) can be determined by the second addressing method 224 to be 212 (203+9), as follows. Coordinate (28,5) is in the next horizontally adjacent tile after coordinate (27,5), because the tile column of (28,5) is 7 (int(x/4)), whereas the tile column of coordinate (27,5) is 6 (int(x/4). Therefore, by equation (1) above, 9 is added to the known address 203, to produce the memory address, 212, of the element that is horizontally adjacent to the element at (27,5). As can be seen with this example, the determination of the memory address based upon a prior known address is computationally simpler than determining the memory address directly from the object coordinate.

To derive the second addressing method 224 of address translator 220, a non-linear relative addressing algorithm is developed for the particular non-linear mapping of coordinates to addresses employed. If the relative addressing scheme need only be accurate for data elements within a particular range in the object space of a prior data element, the non-linear relative addressing of this second method 224 will generally be substantially less complex than the direct non-linear determination of the first method 222. As discussed in the 4×3 tile example, if the range of object coordinates is constrained to one tile length, the non-linear relative addressing is merely the selection of one of two increments in each dimension, depending upon whether the element is within the prior tile or in the 'next' tile.

As the range of applicability of the relative addressing algorithm grows, so will the complexity of the algorithm used for the second addressing method. The appropriate algorithm is determined as the one that provides a sufficient level of range in the object space while still providing computational savings. For example, if adjacent data elements are predominately processed, in an increasing coordinate direction, equations of the form of equations (1) and (2) will be utilized. If data in the same line is typically processed, but at varying horizontal distances from each other, equation (1) would be expanded to include the varying horizontal distances, and equation (2) would remain as shown. Such tradeoffs of complexity versus applicability are common to one of ordinary skill in the art.

Figure 5:
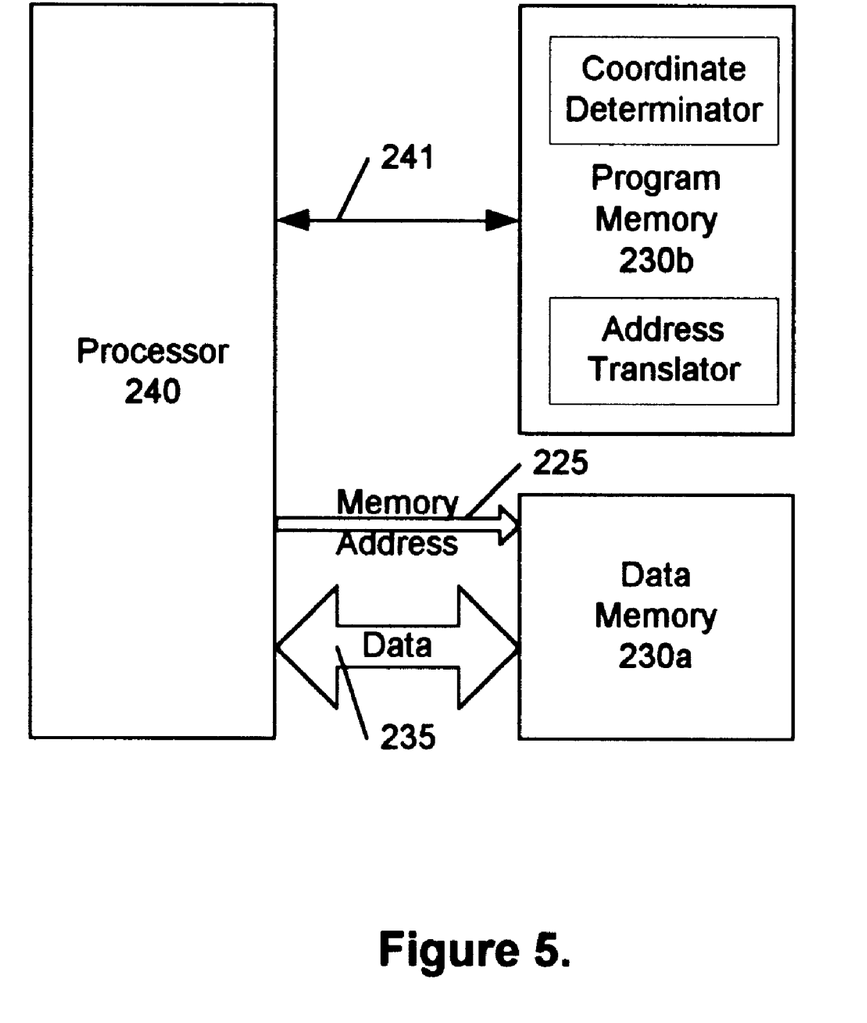
FIG. 5 illustrates another system for accessing memory stored via a non-linear mapping in accordance with this invention.

The address translator 220 may be implemented in hardware, firmware, software, or a combination thereof For example, the first addressing method 222 may be implemented as a software program, because of its complexity, yet the second addressing method 224, being computationally simpler, may be implemented in hardware. Alternatively, the coordinate determinator 210 and address translator 220 may be software modules that the processor 240 processes as required, as shown in FIG. 5. Two memory areas are shown, 230a and 230b. These memory areas may be in the same physical memory, or different memories. The programming instructions that perform the object coordinate determination and the address translation are contained in program memory 230b. The processor 240 executes the instructions contained in memory 230b, via 241, to determine a memory address in the data memory 230a corresponding to an object space coordinate. Alternative arrangements of the processing and address translating components can be devised, depending upon the aforementioned tradeoffs between complexity and applicability common to those of ordinary skill in the art.

Figure 6:
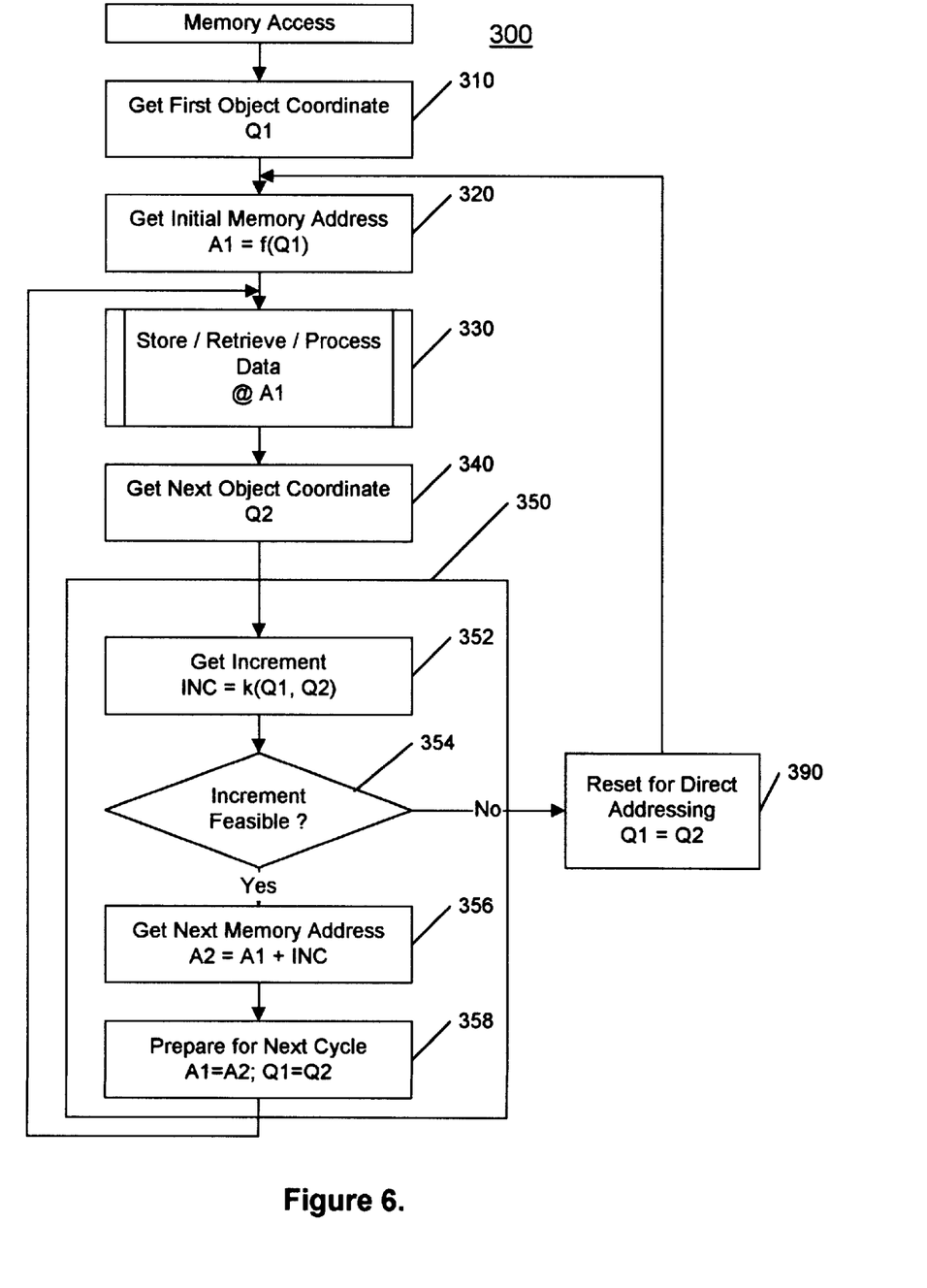
FIG. 6 illustrates a flowchart for accessing memory stored via a non-linear mapping in accordance with this invention.

A flowchart for implementing a memory access scheme in accordance with this invention is shown in FIG. 6. As noted above, the steps shown may be implemented as programming instructions, hardware configurations, and combinations thereof In FIG. 6, the term "object coordinate" is utilized in lieu of the more general term "object address". As discussed above, the object coordinate is merely a unique index to an object element, and is not constrained to the conventional definition of a "coordinate" being a multidimensional index.

At 310, an initial object coordinate Q1 is received, and at 320 the corresponding memory address A1 is determined, using the conventional direct translation, symbolized by function fi. Block 330 represents the process, such as a video graphics process, that requested the data associated with the object element at Q1.

At some subsequent point in time, another object element, at object coordinate Q2 is identified for access, and the coordinate Q2 is received at 340. Although this subsequent object coordinate is shown being received after the block 330 completes the processing of the data of the object element at Q1, the processing at block 330 can be performed in parallel with subsequent object requests, as would be evident to one skilled in the art.

Block 350 represents a second, preferably simpler, algorithm for determining the memory address of object coordinate Q2, based upon the prior object coordinate Q1 and prior memory address A1. Often, the alternative non-linear relative addressing algorithm will comprise the determination of an offset, or increment, to be applied to the prior address. For exemplary purposes, the details of block 350 are shown using this paradigm. Block 352 determines the relative addressing increment INC, based upon the new object coordinate Q2 and the prior object coordinate Q1, symbolized by the function k( ). As discussed above, to provide for computational efficiency, the applicability of the relative addressing function is limited to a predetermined proximity of object coordinates. If the object coordinates are within the prescribed proximity to each other, the function k( ) returns a memory address increment INC; if not, it returns an "increment infeasible" error code. At 354, if the increment is not feasible, the algorithm reverts to the direct computation algorithm, by substituting the new object coordinate for the prior object coordinate at 390, and branching to 320 where the direct computation function f( ) is performed.

If the increment is feasible, at 354, the new memory address A2 is computed as the prior address A1 plus the computed increment INC, at 356. The new object coordinate and memory address replace the prior coordinate and address at 358, and the process branches to the external process at block 330. In this manner, the block 330 receives the memory address A1 of the requested data element independent of whether the address is computed directly or relative to a prior address. Thus it can be seen that, because the increment function k( ) is developed so as to be substantially simpler than the direct addressing function f( ), considerable computational savings can be achieved by providing block 330 the memory address via the relative addressing scheme of block 350 (blocks 352–358), rather than the direct computation at block 320.

As discussed above, any number of alternative relative addressing techniques can be developed, depending upon the particular non-linear addressing scheme employed, and depending upon the level of complexity and applicability of this relative addressing technique. For completeness, a number of exemplary relative addressing techniques are presented herein, although the spirit and scope of this invention are not intended to be limited to these examples.

Figure 7:
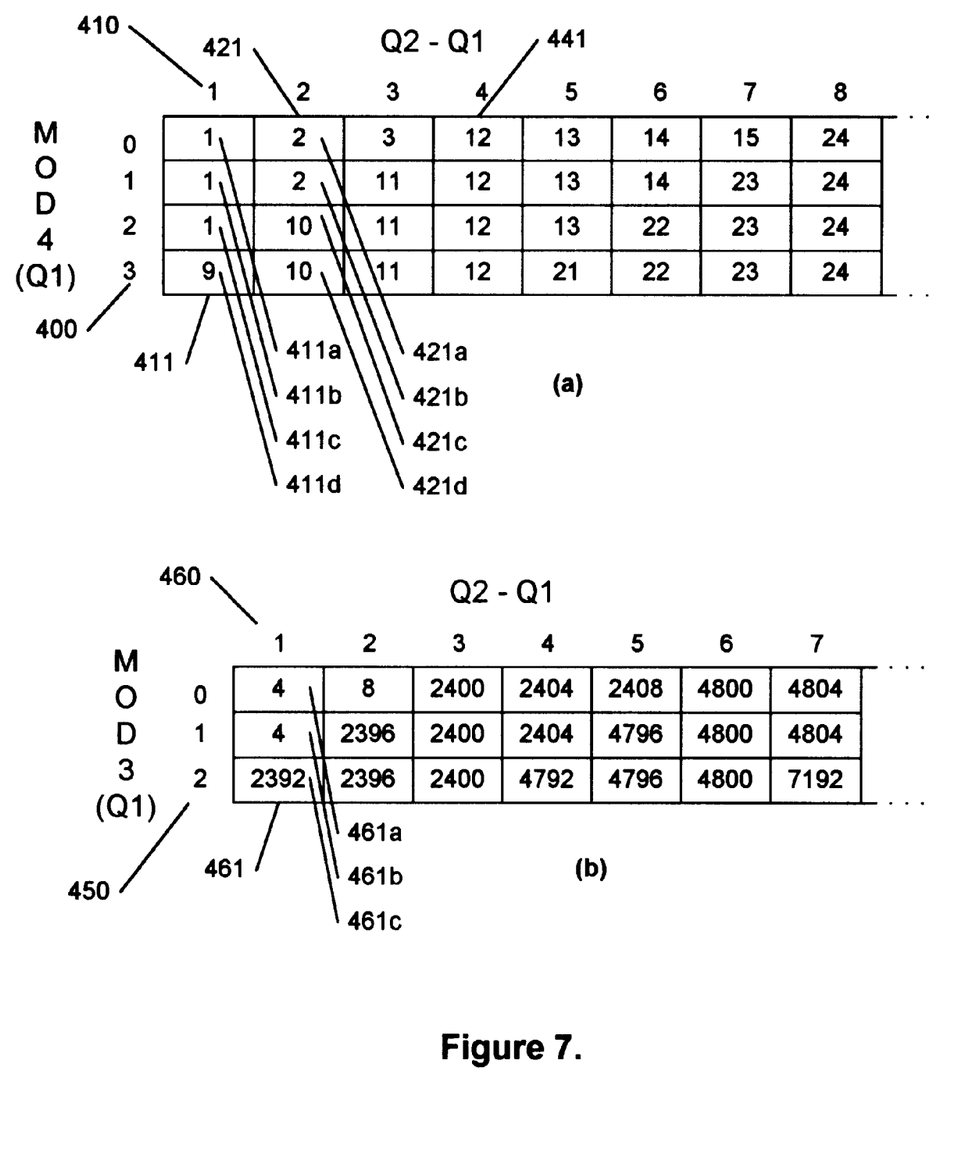
FIG. 7 illustrates tables of increment values for relative addressing in accordance with this invention.

A extension to the concepts presented in equations (1) and (2) are shown in the tables of FIGS. 7(a) and 7(b) for the example 4×3 tiling scheme above. The tables of FIG. 7 are used to determine the appropriate increment value between memory address, as in block 352 of FIG. 6. FIG. 7(a) is used to determine the memory address increment between object coordinates separated by a horizontal, or x, distance. In FIG. 7(a), the rows 400 represent the modulo of the x coordinate of the first object coordinate, the object coordinate for which a memory address has been computed. The columns 410 represent the distance between the x coordinate of a second object coordinate, the object coordinate whose memory address is to be determined, and the x coordinate of the first object coordinate. The first column 411 is a tabular representation of equation (1). The column heading shows a distance between object coordinates of 1; that is, it is the column for computing the incremental memory address for data elements that are next horizontally adjacent. Assuming that the object coordinates start with 0,0, each of the data elements in each 4×3 tile will have x coordinates with modulo base 4 of 0, 1, 2, and 3, from left to right, and y coordinates with modulo base 3 of 0, 1, and 2, from top to bottom. If the first object element has an x coordinate of modulo base 4 of 0, 1, or 2, its next horizontally adjacent object element will be in the same tile; therefore, the increment in memory address from the first object element to the next horizontally adjacent object element is 1, as shown by the entries at 411a–c. If the first object element has an x coordinate with a modulo base 4 of 3, it is the last object element in the tile, and the next horizontally adjacent object element will be in the next tile. As shown at 411d, the appropriate increment to add to the first memory address is 9, consistent with equation (1).

The second column 421 represents the increment value to be added to the first memory address when the distance between the x coordinate of the second object element and the x coordinate of the first object element is 2. In this case, if the first object element is the first or second elements in the tile, as indicated by having a modulo base 4 of 0 or 1, an object element 2 units away must be in the same tile. Therefore, the second object element's memory address is 2 units beyond the first object element's memory address, as shown by 421a and 421b. If the first object element has an x coordinate of modulo base 4 of 2 or 3, an object element two units beyond must be in the next tile. Therefore, the second object element's memory address is 10 units beyond the first object element's memory address, as shown by 421b and 421c. As shown in column 441, object elements which are separated by a distance of 4 in the x dimension must lie in the next tile, and are separated by a distance of 12, independent of the location of the first object element in its tile.

As discussed above, the complexity of the algorithm can be arbitrarily set. In the example of FIG. 7(a), the number of columns can be limited to as few as 1, equivalent to equation (1), or extended to the maximum horizontal width of the object space. The chosen limit to the number of columns will determine the applicable scope of the algorithm. If the number of columns is set to 10, for example, an object element which is separated by more than 10 from the prior object element will result in the "increment infeasible" error code of block 352, and require a direct memory address computation from the object coordinate, at block 320, of FIG. 6.

FIG. 7(b) shows a table, similar to that of FIG. 7(a), for the vertical, or y, dimension of the example 4×3 tile of a object space having a width of 10 tiles. The rows 450 represent the modulo base 3 of the y coordinate of the first object element; the columns 460 represent the difference between the y coordinates of the second object element and the first object element. As shown, column 461 is equivalent to equation (2). If the first object element is in the first two lines of the 4×3 tile, indicated by a modulo base 3 of 0 or 1, the next object element must be in the same tile. Therefore, the memory address of the next vertically adjacent tile is 4 beyond. If the first object element is in the last row (row 3) of the tile, the next vertically adjacent element must be in the next the next tile. Therefore, the memory address of the next vertically adjacent object element (row 1) is 112 (10 tiles*12 elements/tile−2 rows*4 elements/row) beyond the first object's memory address. Shown in column 463, if the vertical distance between object elements is 3 rows (the height of the tile), the memory distance between them is 120, regardless of the location of the first object element in its tile. The size of the table can be arbitrarily set, as discussed above.

Note that in the above examples, the memory address is specified in terms of elements in the object space. As would be evident to one of ordinary skill in the art, each of the actual memory address would be offset by the actual memory address of the first element in the object space, and the increment value would be adjusted for the size of the data element, relative to the size of the memory storage elements. For example, if the elements of the object space each required 4 bytes of storage in memory, and the memory is addressed by a byte address, the entries of FIG. 7 and equations (1) and (2) would be multiplied by a factor of 4.

The x and y relative address determinations are, in general, independent. As such, the relative memory increment for a second object coordinate which is separated from the first object coordinate by a distance of x and y can be determined by adding the increments provided by the tables of FIGS. 7(a) and 7(b). It is to be noted that the size of the independent tables of FIGS. 7(a) and 7(b) determine the range of applicability of the algorithm. If the table of FIG. 7(a) extends to the maximum horizontal distance, and the table of FIG. 7(b) extends to the maximum vertical distance, the scope of the algorithm will be all subsequent object coordinates below and to the right of previous coordinates. Similarly, if the tables are extended to include negative x and y distances between the second and first object coordinates, explicitly or via a sub process, the scope of the relative addressing algorithm will extend to all points within the entire object space.

Additional optimizations can be provided. For example, the first object element can be constrained to be the start of a tile. In this manner, only the first row of FIG. 7(a) and FIG. 7(b) need be stored. Extending this further, the memory address of the element at the (0,0) location in the object space can be prestored, obviating the need to execute the complex direct computation of the non-linear memory address from the object coordinate.

Figure 8:
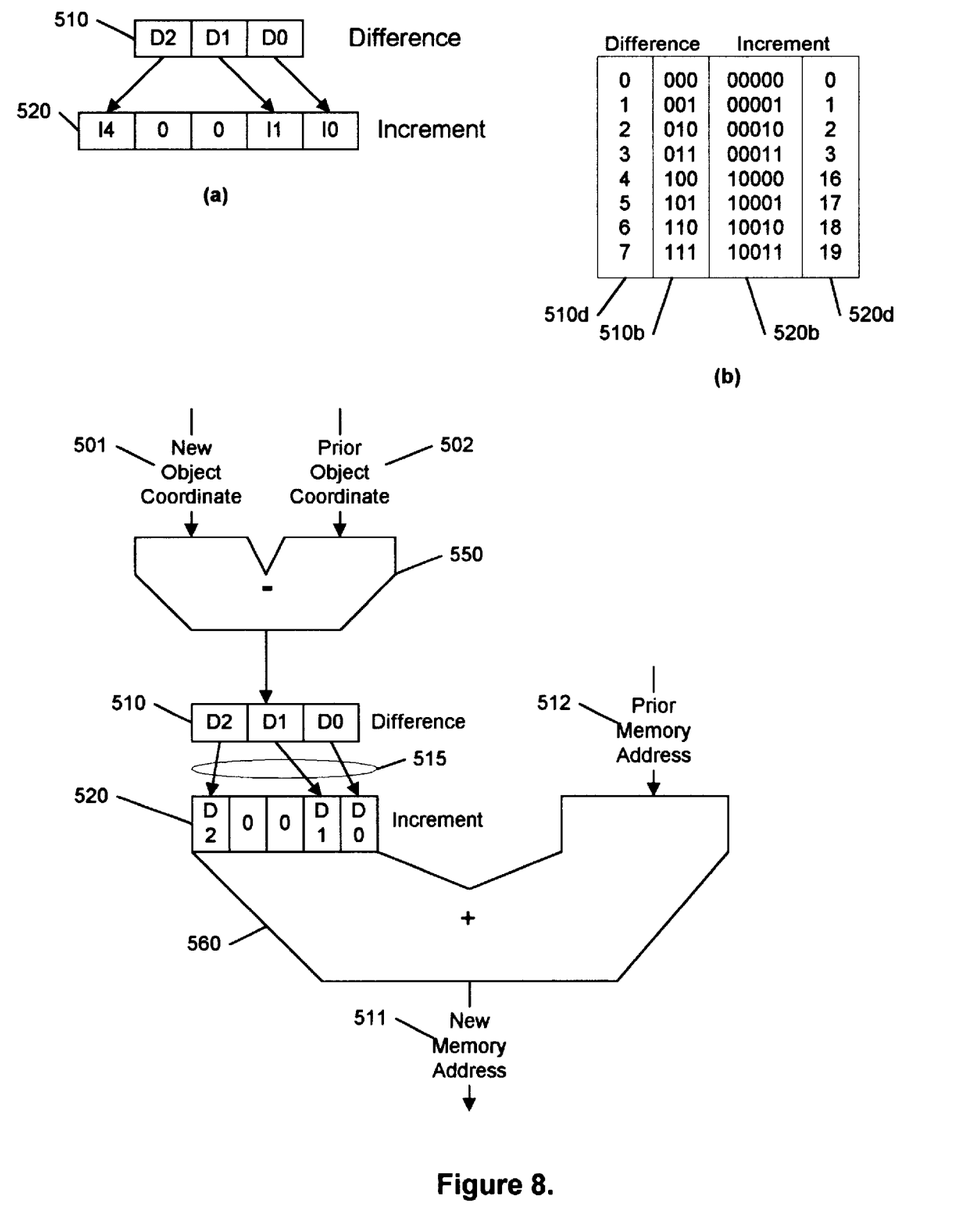
FIG. 8 illustrates an apparatus for producing an increment value for relative addressing directly from the difference between object coordinates, in accordance with this invention.

As will be evident to one of ordinary skill in the art, the particular non-linear addressing scheme employed will determine the complexity and patterns in FIGS. 7(a) and 7(b). Some patterns will lend themselves to algorithmic descriptions, obviating the need for an explicit table. For example, if each dimension in the tile is a power of two, the pattern of increment values will demonstrate a pattern which can be produced by manipulating particular bits of the increment variable, rather than explicitly maintaining a table. For example, in a 4×4 tiling scheme, the increment table in the horizontal direction will show a pattern of 0, 1, 2, 3, 16, 17, 18, 19, for differences of 0 through 7,respectively. Each quadruplet (0,1,2,3) and (16,17,18,19) differs only by the setting of its fifth bit. The third bit of the difference (0–7) correlates exactly to the fifth bit of the increment, and the first and second bits of the difference correlate exactly to the first and second bits of the increment. This relationship is shown in FIG. 8. FIG. 8(a) shows the mapping of the bits D2, D1, D0 of the difference 510 to bits I4, I1, I0 of the increment 520, respectively. FIG. 8(b) shows each of the difference values (0–7) in decimal 510d and binary 510b format, and the corresponding increment binary value 520b effected by the mapping of bits as shown in FIG. 8(a), and the decimal equivalent 520d of the increment value corresponding to each of the difference values. Thus, in this example, the increment can be determined by determining the horizontal difference (the difference in the x coordinates) and merely loading the appropriate bits of the difference into the corresponding bits of the increment.

As would be evident to one of ordinary skill in the art, a bit loading technique for relative address computation is particularly well suited to a hardware implementation, as shown in FIG. 8(c). The subtractor 550 subtracts the prior object coordinate 502 from the new object coordinate 501, to produce the difference 510. Using the appropriate bit mapping 515, the adder 560 is provided an increment value 520 corresponding to the difference 510. The adder 560 adds this increment to the prior memory address 512, corresponding to the prior object coordinate 502, to produce the new memory address 511, corresponding to the new object coordinate 501.

Further optimizations can be achieved when the memory access is strongly coupled to the data processing block 330. If it is known, for example, that the data processing block processes data in an incremental fashion, the entire object coordinates need not be considered, nor an actual difference computed. If it is known that the object coordinates are constrained to be within a bound, only portions of the object coordinates need be compared. For example, if it is known that horizontally adjacent object elements will be processed, the modulo base 4 of the x component of the object coordinate is all that is necessary to determine the appropriate increment. If the modulo base 4 is 3, the increment is 9, otherwise, the increment is 1.

Figure 9:
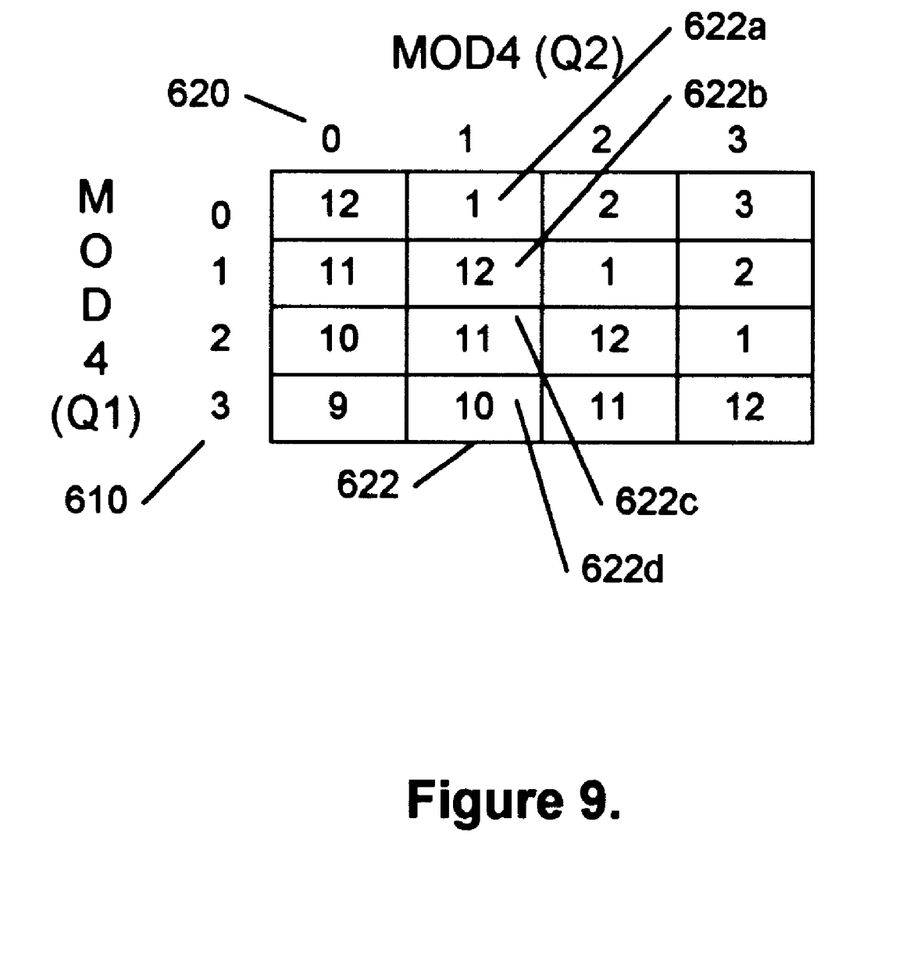
FIG. 9 illustrates another table of increment values for relative addressing in accordance with this invention.

FIG. 9 shows an incremental offset table based upon the modulo base 4 of the x components of the first and second object coordinates in a 4×N tile. This table can be utilized if the second object element is known to be to the right of the first object element, and not more than 4 horizontal units beyond the first object element. It is evident that modulo base 4 merely requires the extraction of the lower two bits of an coordinate. Rather than compute the difference between the object horizontal coordinates, the lower two bits of each horizontal coordinate are used as an index to the table of FIG. 9. The rows 610 correspond to the modulo of the first object coordinate, and the columns 620 correspond to the modulo of the second object coordinate. Consider the second column 622, corresponding to a second coordinate having a modulo base 4 of 1. This corresponds to an object element in the second column of the tile. The second object element is constrained to be to the right of and within a distance of 4 from the first object element. Therefore, if the first object coordinate has a modulo base 4 of 0, corresponding to the first column of the tile, this second object element must be immediately to its right, in the same tile as the first object element. Thus, the memory address increment is 1, at 622a. Likewise, if the first object coordinate has a modulo base 4 of 1, 2, or 3, corresponding to the second, third, and fourth columns of the tile, the second object element, in the second column of its tile, and to the right of the first object element, must be in a different tile, thus the increments of 12, 11, and 10 at 622b, 622c, and 622d, respectively.

As can be seen, by providing a relative addressing scheme that is based on a prior determined address, the determination of an address in a non-linear mapping can be simplified. By determining an incremental value to be added to the prior address, the relative addressing scheme can provide substantial performance improvements, compared to the complex computations normally required for non-linear address determinations.

What is claimed is:

1. A method for accessing a memory that stores a plurality of data elements using a nonlinear tiled addressing process, the method comprises the steps of:
    a) determining an initial memory address corresponding to a first object coordinate, based upon the nonlinear tiled addressing process that computes memory addresses by nonlinearly mapping each of groups of object coordinates in an object space having a plurality of groups of object coordinates; and
    b) determining a second memory address corresponding to a second object coordinate proximal to the first object coordinate, based upon a second addressing process, wherein the second memory address is computed relative to the initial memory address by adding an incremental offset to the initial memory address wherein the incremental offset is selected from a plurality of predetermined values based upon:
        a modulo of the first object coordinate, and
        a difference between the second object coordinate and the first object coordinate.

2. The method of claim 1, wherein the first and second object coordinates each includes an x component and a y component.

3. The method of claim 2, wherein the step of determining the second memory address includes the steps of:
    selecting an incremental offset based upon:
        a portion of the x component of the first and second object coordinates, and
        a portion of the y component of the first and second object coordinates; and, adding the incremental offset to the initial memory address.

4. The method of claim 1 wherein the step of determining the second memory address includes:
    selecting an incremental offset to be:
        a first incrementing value when the second object coordinate has a first parameter,
        a second incrementing value when the second object coordinate has a second parameter; and,
    adding the incremental offset to the initial memory address.

5. Amended) A processing system comprising:
    a processor for processing data elements associated with object coordinates;
    a coordinate determinator operably coupled to the processor to determine the object coordinates;
    a memory operably coupled to store the data elements at memory addresses that have a tiled memory correspondence to the object coordinates; and
    an address translator operably coupled to translate a first object coordinate of the object coordinates into a corresponding first memory address of the memory addresses based on the tiled memory correspondence and to translate a second object coordinate of the object coordinates into a corresponding second memory address of the memory addresses based on the first memory address and a relationship between the first and second object coordinates and including an adder that adds an incremental offset to the first memory address wherein the incremental offset is selected from a plurality of predetermined values independence upon upon:
        a first modulo of the first object coordinate, and
        a second modulo of the second object coordinate.

6. The processing system of claim 5, wherein the object coordinates include an x and a y component.

7. The processing system of claim 6, wherein the address translator comprises an adder that adds an incremental offset to the first memory address, and the incremental offset is based upon:
    a portion of the x component of the first and second object coordinates, and
    a portion of the y component of the first and second object coordinates.

8. The processing system of claim 5, wherein the incremental offset comprises:
    a first incrementing value when the first object coordinate has a first parameter, and,
    a second incrementing value when the first object coordinate has a second parameter.

9. The processing system of claim 5, wherein the incremental offset comprises:
    a first incrementing value when the second object coordinate has a first parameter, and,
    a second incrementing value when the second object coordinate has a second parameter.

10. The processing system of claim 5, wherein the data elements comprise video data.

11. The processing system of claim 5, wherein the address translator includes:
    a subtractor operably coupled to produce a difference output based on the second object coordinate and the first object coordinate,
    an adder operably coupled to the difference output via a bit mapping to add an increment value to the first memory address to produce the second memory address.

12. A processing system comprising:
    a processing unit; and
    a memory operably coupled to the processing unit, wherein the memory stores programming instructions that, when read by the processing unit, cause the processing unit to:
        (a) determine an initial memory address from a first object coordinate, based upon nonlinear addressing process, and
        (b) determine a second memory address corresponding to a second object coordinate proximal to the first object coordinate, based upon the initial memory address and incremental offset from the initial memory address, wherein the incremental offset comprises a first incrementing value when the first object coordinate has a first parameter, and a second incrementing value when first object coordinate has a second parameter.

13. The processing system of claim 12, wherein the first and second object coordinates each includes an x component and a y component, and the incremental offset is dependent upon a portion of the x component and the y component of the first and second object coordinates.

14. A digital storage medium that stores programming instructions that, when read by a processing unit, cause the processing unit to access memory that stores a plurality of data elements via a nonlinear tiled addressing process, the digital storage medium comprises:

first storage means for storing programming instructions that cause the processing unit to determine an initial memory address from a first object coordinate, based upon the nonlinear tiled addressing process; and second storage means for storing programming instructions that cause the processing unit to determine a second memory address corresponding to a second object coordinate proximal to the first object coordinate, based upon the initial memory address and incremental offset from the initial memory address, wherein the incremental offset comprises a first incrementing value when the first object coordinate has a first parameter, and a second incrementing value when first object coordinate has a second parameter.

15. The digital storage medium of claim 14, wherein the first and second object coordinates each comprises an x component and a y component, and the incremental offset is dependent upon a portion of the x component and the y component of the first and second object coordinates.

16. A method for accessing a memory that stores a plurality of data elements using a nonlinear tiled addressing process, the method comprises the steps of:

determining an initial memory address corresponding to a first object coordinate, based upon the nonlinear tiled addressing process that computes field memory addresses by nonlinearly mapping each of groups of object coordinates in an object space having a plurality of groups of object coordinates; and determining a second memory address corresponding to a second object coordinate proximal to the first object coordinate, based upon a second addressing process, wherein the second memory address is computed relative to the initial memory address, wherein the first and second object coordinates each includes an x component and a y component and wherein determining the second memory address includes the steps of:

selecting an incremental offset based upon:
  a portion of the x component of the first and second object coordinates, and
  a portion of the y component of the first and second object coordinates; and
  adding the incremental offset to the initial memory address.

17. The method of claim 16, wherein the nonlinear addressing process includes a tiled memory address process.

18. A processing system comprising:

a processor for processing data elements associated with object coordinates;

a coordinate determinator operably coupled to the processor to determine the object coordinates;

a memory operably coupled to store the data elements at memory addresses that have a tiled memory correspondence to the object coordinates; and an address translator operably coupled to translate a first object coordinate of the object coordinates into a corresponding first memory address of the memory addresses based on the tiled memory correspondence and to translate a second object coordinate of the object coordinates into a corresponding second memory address of the memory addresses based on the first memory address and a relationship between the first and second object coordinates, wherein the object coordinates include an x and a y component and wherein the address translator comprises an adder that adds an incremental offset to the first memory address.

19. The processing system of claim 18, wherein the non-linear correspondence between the memory addresses and the object coordinates is a tiled memory correspondence.

20. The processing system of claim 18, wherein the adder adds the incremental offset to the first memory address, and the incremental offset is based upon:

a portion of the x component of the first and second object coordinates, and a portion of the y component of the first and second object coordinates.

* * * * *